United States Patent
Wu et al.

(10) Patent No.: US 11,225,018 B2
(45) Date of Patent: Jan. 18, 2022

(54) 3D PRINTING METHOD AND DEVICE WITH MULTI-AXIS MECHANICAL SYSTEM AND VISUAL SURVEILLANCE

(71) Applicants: Beijing University of Technology, Beijing (CN); Beijing Cloud Profound Technologies Company Limited, Beijing (CN)

(72) Inventors: Lifang Wu, Beijing (CN); Miao Yu, Beijing (CN); Yisong Gao, Beijing (CN); Lidong Zhao, Beijing (CN); Yuan Gao, Beijing (CN); Xiaohua Guo, Beijing (CN); Meng Jian, Beijing (CN); Changling Wang, Beijing (CN); Ziming Zhang, Beijing (CN); Yuanzheng Shi, Beijing (CN)

(73) Assignees: Beijing University of Technology, Beijing (CN); Beijing Cloud Profound Technologies Company Limited, Beijing (CN)

( * ) Notice: Subject to any disclaimer, the term of this patent is extended or adjusted under 35 U.S.C. 154(b) by 145 days.

(21) Appl. No.: 16/446,314

(22) Filed: Jun. 19, 2019

(65) Prior Publication Data
US 2019/0299523 A1    Oct. 3, 2019

Related U.S. Application Data

(63) Continuation of application No. PCT/CN2016/111194, filed on Dec. 21, 2016.

(51) Int. Cl.
*B29C 64/245* (2017.01)
*B29C 64/379* (2017.01)
(Continued)

(52) U.S. Cl.
CPC .......... *B29C 64/245* (2017.08); *B29C 64/118* (2017.08); *B29C 64/209* (2017.08);
(Continued)

(58) Field of Classification Search
CPC ... B29C 64/245; B29C 64/241; B29C 64/393; B29C 64/379; B29C 64/118;
(Continued)

(56) References Cited

U.S. PATENT DOCUMENTS

| 2014/0129021 A1* | 5/2014 | Boynton | .................. G06F 30/20 |
| | | | 700/118 |
| 2016/0137839 A1* | 5/2016 | Rolland | ............... C09D 175/04 |
| | | | 522/81 |

(Continued)

FOREIGN PATENT DOCUMENTS

| CN | 104859147 A | 8/2015 |
| CN | 105818373 A | 8/2016 |

(Continued)

OTHER PUBLICATIONS

Chen S, Liu T, Shu Z, Xin S, He Y, et al. (2018) Fast and robust shape diameter function. PLOS One 13(1): e0190666 (Year: 2018).*

(Continued)

*Primary Examiner* — Michael M. Robinson
(74) *Attorney, Agent, or Firm* — Crowell & Moring LLP

(57) ABSTRACT

A multi-degree-of-freedom (Multi-DOF) 3D printing device includes a printer mechanism, a rotatable platform, a visual inspection system, and a control system. The printing mechanism includes a print head. The printing mechanism and the rotatable platform are combined to have three degrees of freedom of translation, and the rotatable platform has two degrees of freedom of rotation. The visual inspection system includes a camera mounted to nearby the print head and the relative position of camera and print head (Continued)

remains constant. The control system is configured to implement the printing process. The model is decomposed into several components, each of which could be printed in a single direction. After one component is printed out, the platform is then rotated so that the cutting plane for the component will be printed is horizontal.

12 Claims, 9 Drawing Sheets

(51) Int. Cl.
| | |
|---|---|
| *B29C 64/118* | (2017.01) |
| *B29C 64/209* | (2017.01) |
| *B29C 64/227* | (2017.01) |
| *B29C 67/00* | (2017.01) |
| *B33Y 50/02* | (2015.01) |
| *B29C 64/393* | (2017.01) |
| *B29C 64/241* | (2017.01) |
| *G05B 19/4099* | (2006.01) |
| *B33Y 10/00* | (2015.01) |
| *B33Y 30/00* | (2015.01) |
| *B33Y 40/00* | (2020.01) |

(52) U.S. Cl.
CPC .......... *B29C 64/227* (2017.08); *B29C 64/241* (2017.08); *B29C 64/379* (2017.08); *B29C 64/393* (2017.08); *B29C 67/00* (2013.01); *B33Y 50/02* (2014.12); *G05B 19/4099* (2013.01); *B33Y 10/00* (2014.12); *B33Y 30/00* (2014.12); *B33Y 40/00* (2014.12); *G05B 2219/49007* (2013.01)

(58) Field of Classification Search
CPC . B29C 64/209; B29C 64/227; G05B 19/4099; G05B 2219/49007; B33Y 50/02; B33Y 10/00; B33Y 30/00; B33Y 40/00
See application file for complete search history.

(56) References Cited

U.S. PATENT DOCUMENTS

| | | | | |
|---|---|---|---|---|
| 2016/0203637 | A1* | 7/2016 | Luo | G06T 7/174 345/420 |
| 2016/0311165 | A1* | 10/2016 | Mark | B33Y 70/00 |
| 2018/0361729 | A1* | 12/2018 | Gibson | B25J 9/1697 |

FOREIGN PATENT DOCUMENTS

| | | |
|---|---|---|
| CN | 106217874 A | 12/2016 |
| CN | 106163771 B | 1/2019 |
| WO | WO2018/112770 A1 | 6/2018 |

OTHER PUBLICATIONS

International Search Report for International Application No. PCT/CN2016/111194 dated Sep. 21, 2017 (4 pgs).

* cited by examiner

3D PRINTING METHOD AND DEVICE WITH MULTI-AXIS MECHANICAL SYSTEM AND VISUAL SURVEILLANCE

CROSS-REFERENCE TO RELATED APPLICATION

The present application is a continuation of International Patent Application No. PCT/CN2016/111194, filed on Dec. 21, 2016, which is incorporated herein by reference in its entirety.

TECHNICAL FIELD

The disclosure relates to related technologies of intelligent control and computer vision. It studies a Multi-DOF 3D printing device and method. Specifically, it involves the construction of Multi-DOF 3D printing device, model decomposition, visual feedback on platform rotation, and printing path planning, so that any complex three-dimensional model can be printed with the external support as less as possible.

BACKGROUND 3D printer was first invented by American scientists in the 1980s. It is a device that uses 3D printing technology to produce real three-dimensional objects. The basic principle is to print out a 3D object using a special consumable (glue, resin or powder, etc.) according to a three-dimensional model pre-designed by a computer.

With the rapid development of 3D printing technology, many different types of 3D printing technologies have appeared in recent years, such as Fused Deposition Modeling (FDM), Laminated Object Manufacturing (LOM), and Selective Laser Sintering (SLS), Three-Dimensional Printing (3DP), Digital Light Processing (DLP) 3D printing technology, etc. These technologies have their own characteristics to meet the needs of different invention fields. FDM was invented by Scott Crump in 1988. Scott Crump registered the technology as a patent in 1989, and established Stratasys, which has become one of the most famous companies in the field of 3D printing. The principle of FDM technology is to melt the plastic wire (usually ABS and PLA plastic) and selectively extruding the melted materials on a workspace. The print head raise a certain height every time one layer is printed. The current FDM process is widely used in automobiles, aerospace, household appliances, power tools, education, model manufacturing, toy manufacturing, construction and other fields because of its simple construction principle and operation, low maintenance cost, safe system operation, and many optional materials and large printing scale. It has even been used as household 3D printer, so there is a huge demand for FDM 3D printing.

Traditional FDM 3D printers assemble the printed materials layer by layer in a single direction. It is difficult to print complex 3D models using these printers. In some cases, the model is decomposed into several components, which are printed separately. These printed components are assembled into the complete model. Assembling the components into a complete model may influence the applications of the printed objects. Many models cannot print directly from a single direction during the actual printing process. The extra support structure is required so that the models are printable. And these support structures should be removed after printing. On the one hand, printing the extra support structures costs the printing materials, and on the other hand, it influences the quality of the surface of the model.

SUMMARY

The disclosure intends to propose a Multi-DOF 3D printing method and design the corresponding device with multi-axis mechanical system and visual surveillance. Let's take FDM (Fused Deposition Modeling) 3D printing method and device as an example, the method combines with model automatic decomposition and planning the printing order of the components to achieve multi-directional 3D printing, to print models with the external support as less as possible. The visual surveillance system monitors the platform rotation in real time.

In order to solve the above technical problem, an embodiment of the disclosure provides a Multi-DOF 3D printing device, which comprising a printing mechanism, a rotatable printing platform, a visual inspection system and a control system. The printing mechanism includes a print head. The print head is adapted to print on the platform. The printing mechanism and the rotatable platform are combined together to provide at least three degrees of freedom of translation. The rotatable platform has at least two degrees of freedom of rotation. The visual inspection system includes a camera which is mounted with the print head together and can be moved with the print head together. The control system is configured to decompose a model to be printed into several components; and wherein, before printing each component, the orientation of a base plane of the component to be printed is monitored by the camera, the base plane is provided by the components that have been printed on the rotatable platform, meanwhile the rotatable platform is rotated, so that the base plane of the component to be printed is in an orientation which is suitable for the print head to perform printing. The objective is that the component to be printed can be fully supported by the components that have been printed. It should be noted that the first component is supported by the platform.

According to a possible embodiment, the printing mechanism comprises a vertical translational motor assembly and a first horizontal translational motor assembly. The vertical translational motor assembly drives the print head to move in a vertical direction, and the first horizontal translation axis drives the print head to move in a first horizontal direction that is perpendicular to the vertical direction. The rotatable platform includes a second horizontal translational motor assembly, a first rotational motor assembly and a second rotational motor assembly. The second horizontal translational motor assembly drives the platform to move in the second horizontal direction perpendicular to the vertical direction and the first horizontal direction. The first rotation motor assembly drives the platform to rotate around a vertical rotational axis. The second rotation motor assembly drives the platform to rotate around a horizontal axis.

According to a possible embodiment, the first rotation axis, the second rotation axis and the platform are mounted on the second horizontal translation motor assembly and their horizontal motion is driven by the second horizontal translation motor assembly. The second rotation axis and the platform are mounted on the first rotation motor assembly and the rotation around the vertical axis is driven by the first rotation motor assembly. Motion of the platform is driven by the second rotation motor assembly.

According to a possible embodiment, if the first rotation motor assembly does not drive the second rotation axis and the platform rotation, the axis cord of the second rotational axis extends in the first horizontal axis.

According to a possible embodiment, the control device compares the captured image of the camera with the base plane of the component to be printed to determine whether the base plane has reached the orientation suitable for printing by the print head.

According to a possible embodiment, the orientation suitable for printing by the print head satisfies the condition that the base plane of the component to be printed is horizontal and the normal of the base plane is vertically upward.

According to a possible embodiment, the orientation suitable for printing by the print head further satisfies the following condition: during the printing process of each component, the angle between the print head and the base plane of the component is not greater than the assigned threshold.

According to a possible embodiment, the orientation suitable for printing by the print head further satisfies the condition that the projection of the center of gravity of each component on the base layer must be within the base convex hull.

According to a possible embodiment, the control device is arranged such that each component is printed with the same angle between the print head and the platform. And the component to be printed is supported only by the printed components and platform. At the same time, the printing order of the components is determined.

According to a possible embodiment, the camera comprises a single camera which can be arranged on one side of the print head. The control system constructs a pseudo binocular stereo vision system by the camera. The pseudo binocular stereo vision system measures the level of the cross-section and calculates the angle between the cross-section and the horizontal plane.

According to a possible embodiment, the camera comprises a pair of cameras arranged on opposite sides of the print head. For example, cameras are arranged on both sides of the first horizontal direction of the print head. The control system measures the level of the cross-section and calculates the angle between the cross-section and the horizontal plane by binocular stereo vision composed by the pair of cameras.

According to a possible embodiment, the control software is configured to decompose the 3D model to be printed in the steps described below. First, calculate the skeleton of the 3D model to be printed. Then calculate the normalized SDF values of each face of the model. The input 3D model is subjected to model surface segmentation, wherein the SDF value is used as an adjustment factor. The 3D model is initially divided into multiple components based on the boundary of the model surface segmentation. Select the first component to be printed and determine the printing order of other components based on the connection relationship between components. The results of the preliminary division are adjusted so that the cutting planes between adjacent components become printable.

According to a possible embodiment, the control software is arranged to adjust the cutting plane. Components that do not satisfy the following conditions are merged: the cutting planes cannot intersect in the model, and the vectors of cross-section are oriented upwards.

According to a possible embodiment, the control software is arranged to adjust the cutting plane between the adjacent components such that the angle between the print head and the surface of the component to be printed is not greater than the threshold.

The disclosure also provides a multi-degree-of-freedom (Multi-DOF) 3D printing method, the implementation steps are as follows: entering a three-dimensional model to be printed; dividing the three-dimensional model to be printed into several components; for each component, positioning a platform in an orientation suitable to be printed by a print head so that the component is sufficiently supported by components that have been printed; and printing each component in sequence using the print head.

The Multi-DOF 3D printing method of the disclosure is particularly suitable for the Multi-DOF 3D printing device described above.

Therefore, the features previously described for Multi-DOF 3D printing device are suitable for the Multi-DOF 3D printing method of the disclosure.

It should be noted that, when the printing device and method of the disclosure are applied to a model of a complicated shape, some parts of the model may not fully satisfy the conditions described above, for example, the extra supports are inevitable to ensure the large overhanging parts printable. Nevertheless, the disclosure can print without external support for the main part of the model.

The presented 3D printing method and device with multi-axis mechanical system and visual surveillance has the following advantages:

1) Printing model by the presented method can save printing materials and save time for manual removal of the extra support structures;

2) This multi-axis 3D printing method can print any complicated model with the external support as less as possible. It has strong applicability. Therefore, the disclosure has a certain application value and significance.

DRAWINGS

DETAILED DESCRIPTION

Some embodiments of the disclosure will be described in detail with reference to the drawings. It should be noted that the printing device and method in the disclosure are applicable to any 3D model.

The disclosure provides a Multi-DOF FDM (Fused Deposition Modeling) 3D printing method and device with multi-axis mechanical system and visual surveillance, combining with model automatic decomposition and component printing order planning technology to achieve multi-directional layer stacking of 3D printing, to print models with the external support as less as possible. The visual surveillance system monitors the platform rotation in real time.

The Multi-DOF 3D printing device is designed by adding two rotational axes to the traditional 3D printer to move with at least five degrees of freedom. It can print in multiple directions to print models with the external support as less as possible. An industrial camera is attached next to the extruder to capture image information. It provides real-time monitoring and feedback to the rotation result.

Figure 1:
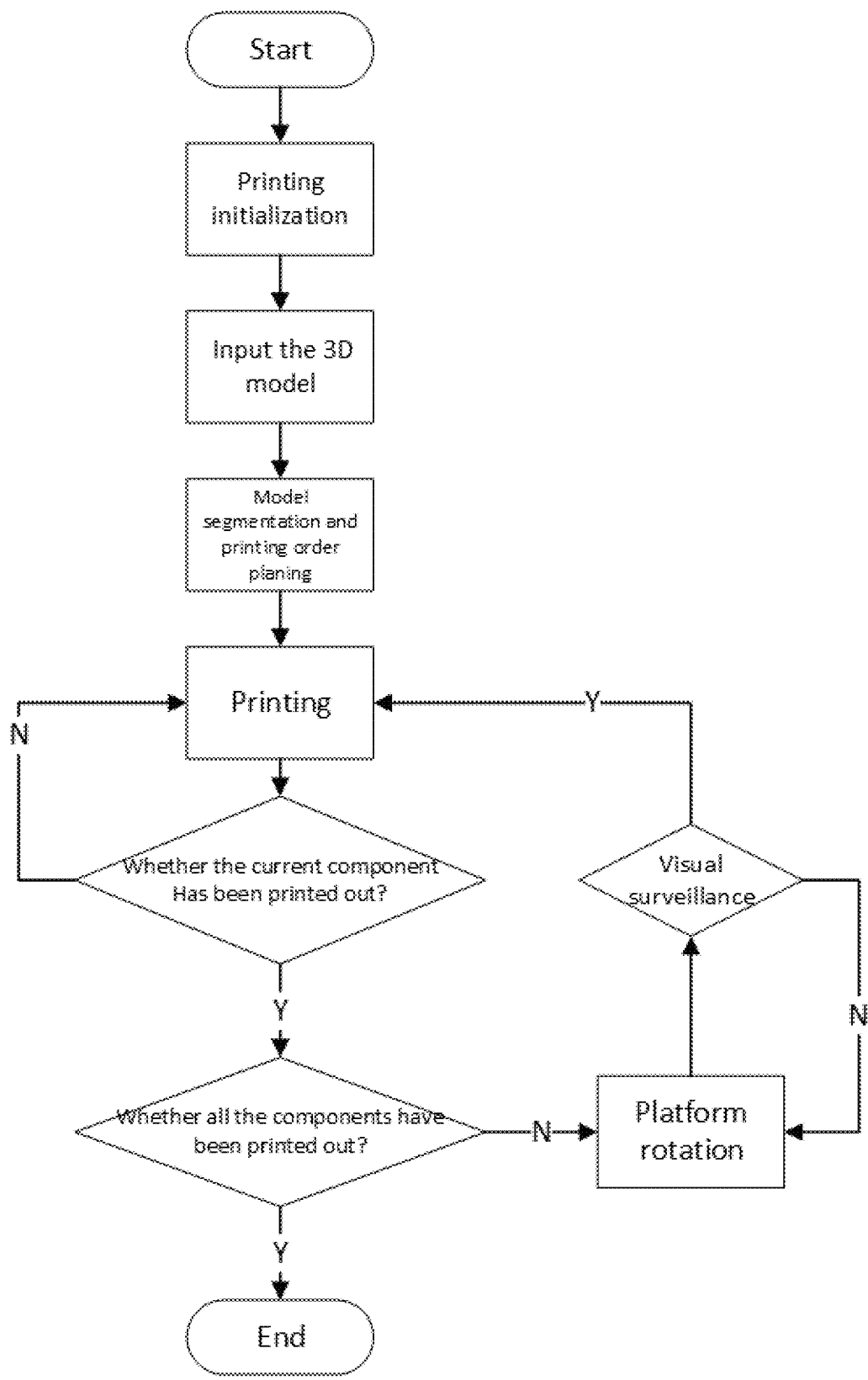
FIG. 1 is a flow chart of the proposed 3D printing method with multi-axis mechanical system and visual surveillance.

FIG. 1 shows the multi-DOF 3D printing method (in the case of FDM 3D printing) with multi-axis mechanical system and visual surveillance, including the following steps:

Step 1: Start.

Step 2: Printing initialization. This step includes initialization operations including camera calibration, binocular measurement (using a binocular stereo vision system, or building a pseudo binocular stereo vision system with a monocular camera).

Step 3: Input the 3D model to be printed.

Step 4: The software implements model decomposition and decomposes the model into several components. Then the software determines the printing order of all the components. In this step, the base plane of each component and its normal vector are calculated and saved.

Step 5: Print the components one by one. Gcode (commands in the NC program) file is generated by Cura (a software with front-end display, resizing, slicing, and control printing). The component is then printed layer-by-layer using the extruder. Through this step, each component can be printed by the FDM 3D printer without external support if the angle between the extruder and the platform is smaller than or equal to the assigned threshold.

Step 6: The printing process is monitored to determine whether the current component has been printed out. If the printing process of the current component is not finished, return to step 5 to continue printing. If the printing process of the current component is finished, go to Step 7.

Step 7: The printing process is monitored to determine whether all the components have been printed out. If all components have been printed, go to Step 8. Otherwise, go to Step 9.

Step 8: The whole printing process is finished.

Step 9: The platform is rotated so that the base plane of the next component is in the required position, and then go to Step 10.

Step 10: The base plane of the component to be printed provided on the printed components is monitored by the industrial camera. If the error is not in the required range, go to Step 9 until the platform in the required position. Otherwise, go to Step 5. Determine the next component to be printed according to the print order. The Gcode of the next component is loaded, and printing continues until all components are printed out.

It should be noted that, when the printing order of each component is determined in Step 4, the first printing component (possibly one or more) is a component which can be printed without external support when the platform is in the initial horizontal position.

In addition, the limitation of platform rotation is considered in the model decomposition in Step 4. The portion of model that can print without external support structure is divided as a component.

During the platform rotation in Step 9, the platform is rotated so that the component to be printed can be sufficiently supported by the printed components (possibly one or more), for example, the base plane of the component to be printed is horizontal. Furthermore, the projection of the center of gravity of the component to be printed in the base plane is located within the outer contour of the cross-section, preferably at or near the geometric center of the cross-section. Therefore, the component is only supported by the printed part without additional support to ensure printability.

It should be noted that each component has its base plane, which is the plane on the component is printed, that is also the cross-section between the component to be printed and the printed components. Base plane is thought as a restricted region with an outer contour.

Figure 2:
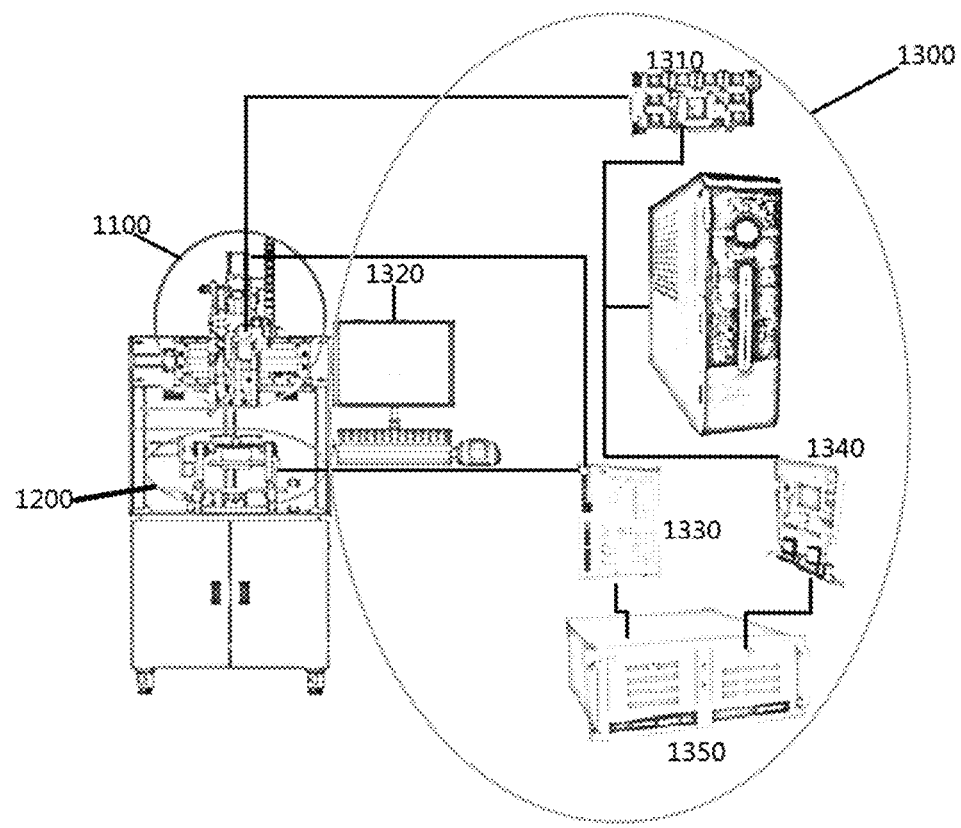
FIG. 2 is an overall view of the multi-axis FDM 3D printing device.

Understandably, the above printing process can be implemented in a variety of suitable manners. FIG. 2 shows a multi-DOF 3D printing device (for example, an FDM 3D printing device) with multi-axis mechanical system and visual surveillance provided by the disclosure. The multi-DOF 3D printing device can perform the above printing process, mainly includes: visual inspection and printing mechanism (1100), $Y\theta_1\theta_2$ three-dimensional work table (1200), and control system (1300). The visual inspection and printing mechanism (1100) and the $Y\theta_1\theta_2$ three-dimensional work table (1200) cooperate to realize five-degree-of-freedom printing. The control system (1300) is connected to the visual inspection and printing mechanism (1100) and the $Y\theta_1\theta_2$ three-dimensional work table (1200). The control system (1300) controls the operations of the visual inspection and printing mechanism and the $Y\theta_1\theta_2$ three-dimensional work table. The visual inspection and printing mechanism (1100), the $Y\theta_1\theta_2$ three-dimensional work table (1200) and the control system (1300) are preferably supported by one rack or may be mounted on the respective racks. Various electrical control devices and electronically controlled mounting plates for the printing device can be mounted inside the rack.

Figure 3:
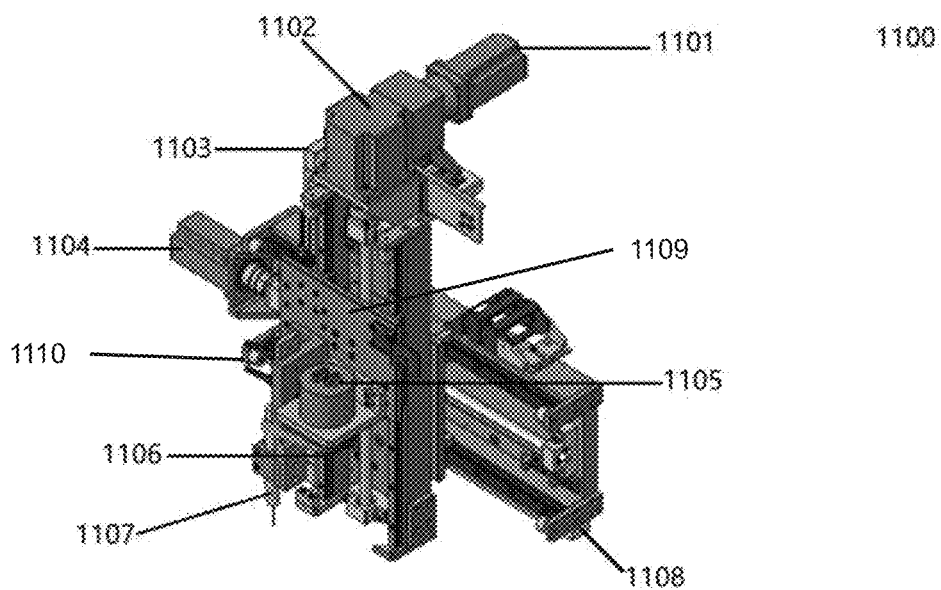
FIG. 3 is a detailed view of the visual inspection system and the printing mechanism of the multi-axis FDM 3D printing device.

As shown in FIG. 3, the visual inspection and printing mechanism (1100) mainly includes a visual inspection section and a printing module. The visual inspection module mainly includes a vertical translational motor assembly, a translational motor assembly moving in the first horizontal direction, and an industrial camera. The printing section mainly includes a print head. The visual inspection and printing mechanism (1100) primarily implements control of movement of the camera and print head. It also controls the print head to print. The vertical translational motor assembly mainly include the vertical control motor (1101), reducer (1102), the grating in vertical direction (1103). The translational motor assembly moving in the first horizontal direction mainly include: the control motor in the first horizontal direction (1104), the grating in the first horizontal direction (1108). The industrial camera mainly includes: CCD camera (1105) and camera light source (1106).

The printing mechanism mainly includes a print head (1107) with a thermistor, which works by heating and melting the plastic material (generally ABS and PLA plastic). The platform (1203) is heated to the predetermined temperature at the same time. The print head then selectively squeezes out the material in the molten state onto the platform under the control of the computer. The print head lifts a certain height when one layer is finished.

As shown in FIG. 3, the vertical control motor 1101 and the control motor in the first horizontal direction (1104) cooperate to control the motion of the print head (1107). For example, the control motor in the first horizontal direction (1104) and the print head (1107) are mounted on the output of the vertical control motor (1101), and the vertical control motor (1101) drives the control motor in the first horizontal direction (1104) and the print head (1107) to move up and down. The print head (1107) is mounted on the output of the control motor in the first horizontal direction (1104). The control motor (1104) drives the print head (1107) to move left and right. The print head (1107) is vertically downward.

The reducer (1102) is used to decelerate the motion of the vertical control motor (1101), for example, a speed ratio of 1:5. The control motor in the first horizontal direction (1104) can also be equipped with suitable speed reducers. The grating in vertical direction (1103) and the grating in the first horizontal direction (1108) are used to monitor the movement of the print head (1107).

The CCD camera (1105) and camera light source (1106) move with the print head (1107), the distance from the print head (1107) to the camera does not change. For example, the CCD camera (1105) can be fixed next to the print head (1107).

Figure 4:
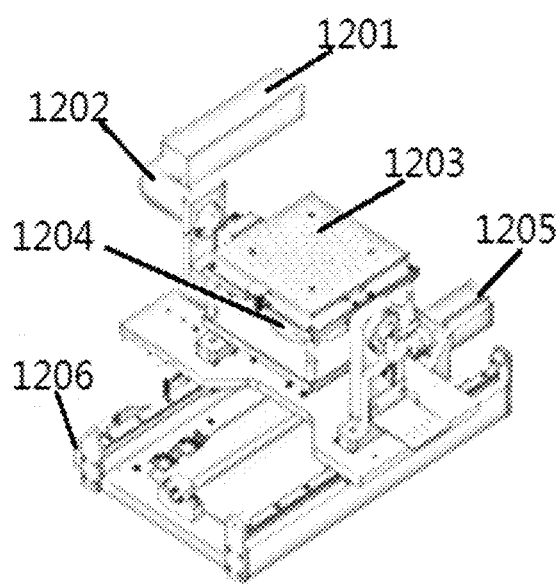
FIG. 4 is a detailed view of a three-dimensional platform of the multi-axis FDM 3D printing device.

As shown in FIG. 4, the $Y_{e_1\theta_2}$ 3D platform (1200) is composed of the translational motor assembly in the second horizontal direction, the first rotational motor assembly, the second rotational motor assembly, and a platform (1203). Its function is to control the rotation of the platform (1203) to make the base plane of any component is perpendicular to the print head and control the translation in the second horizontal direction. Platform (1203) is generally disposed under the print head (1107). The first rotational motor assembly mainly includes a control motor in the first rotational direction (1201) and a reducer (1202). The translational motor assembly in the second horizontal direction mainly includes a control motor in the second rotational direction (1204) and an optional speed reducer. The control motor in the second horizontal direction mainly include a control motor in the second horizontal direction (1205), a grating in the second horizontal direction (1206) and optional speed reducer.

The control motor in the second horizontal direction (1205), the control motor in the first rotational direction (1201) and the control motor in the second rotational direction (1204) cooperate to control the motion of the platform (1203) in the second horizontal direction, the first rotational direction and the second rotational direction. For example, the control motor in the first rotational direction (1201), the control motor in the second rotational direction (1204), and the platform (1203) are installed at the output of the control motor in the second horizontal direction (1205), and the control motor in the second horizontal direction (1205) drives the control motor in the first rotational direction (1201), the control motor in the second rotational direction (1204), and the platform (1203) to move in the second horizontal direction; control motor in the first rotational direction (1201) and a platform (1203) are installed at an output of the control motor in the second rotational direction (1204). The control motor in the second rotational direction (1204) controls the control motor in the first rotational direction (1201) and the platform (1203) to rotate in the first rotational direction. The platform (1203) is installed at the output of the control motor in the first rotational direction (1201). The control motor in the first rotational direction (1201) controls the platform (1203) to rotate in the second rotational direction.

Five DOF printing is achieved by combining the print head (1107) and the platform (1203). The visual inspection and printing mechanism (1100) and the $Y\theta_1\theta_2$ three-dimensional work table (1200) form a five-DOF mechanical system.

As shown in FIG. 2, the control system (1300) mainly includes: an image capture card (1310) connected to both the CCD camera (1105) and the camera light source (1106), a display (1320), a motor drive component (1330) for controlling the operation of each of the aforementioned motors, and a CAN card (Controller Area Network, 1340) be used for communication, it can communicate between serial ports and connect to the image capture card (1310) or separately and connected to the computer (1360), a power (1350) supply for powering the control device. The image capture card (1310) can be integrated into the host computer (1360) or independently connected to the host computer. The motor drive assembly (1330) can be configured as a separate circuit board that can be integrated into the host computer (1360) or connected to the host computer (1360). The power source (1350) can be an additional power source that is independent of the host computer (1360).

The disclosure also provides a 3D printing method with multi-axis mechanical system and visual surveillance, it can implement the above-described printing. A printing method (exemplified by a multi-DOF FDM 3D printing method) which can be realized by the printing device described above or printing devices having a similar function, which includes the following steps:

Step 100 (a feasible embodiment of Step 2 described above): Printing initialization mainly includes initialization operations such as camera calibration, binocular measurement (using a binocular stereo vision system, or building a pseudo binocular stereo vision system with a monocular camera). The disclosure uses a visual monitoring device (JAI camera sp-20000c-pmcl and PENTAX optical lens YF5028) to monitor the rotational plane. The industrial camera is fixed next to the print head and mainly monitors the outline of the printed components to determine if the platform is in the correct position.

Step 200 (a feasible embodiment of the Step 4 described above): The input three-dimensional model is segmented in this step. The principle of model decomposition is to ensure that each component after the segmentation can be printed without external support if the rotational angle of the platform is constant. The result of the model decomposition is finally obtained, and the printing order is determined.

Step 300 (a possible embodiment of the actions in Steps 5, 9, 10 described above): The software controls the mechanical system. The visual inspection and printing mechanism and the $Y\theta_1\theta_2$ 3D platform are controlled by the corresponding control interface. Then the model is printed in accordance with the segmentation result and the printing order determined in Step 200. It mainly involves the cooperation between different mechanical structures and the control of the material extrusion of the print head.

Figure 5A:
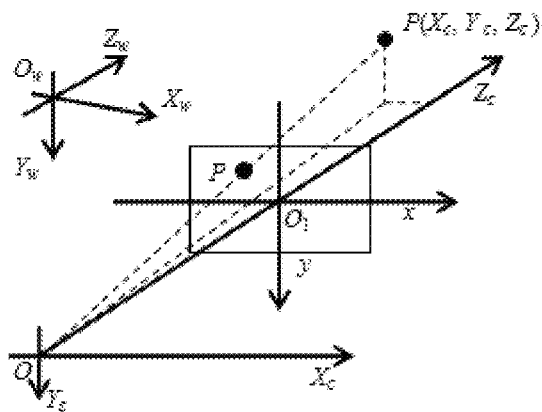
FIG. 5A is a camera pinhole imaging model.

According to a possible embodiment, Step 100 comprises the following substeps:

Substep 110: To reduce the error in camera detection, we calibrate the camera to calculate the actual coordinate position of the marker points set on the platform, that is, the world coordinates in computer vision. As shown in FIG. 5A, the camera model has a two-dimensional image coordinate system and a three-dimensional camera coordinate system. The world coordinate system is projected onto the two-dimensional plane through the projection model and needs to be converted by the three-dimensional camera coordinate system. The point O is the camera optical center (projection center). The $X_c$ axis is parallel to the x-axis of the imaging plane coordinate system, and the $Y_c$ axis is parallel to the y-axis of the imaging plane coordinate system. The $Z_c$ axis is the optical axis of the camera and it is perpendicular to the image plane. The intersection of the optical axis and the image plane is the center point $O_1$ of the image. The coordinate system O-$X_c Y_c Z_c$ is coordinate system of the camera. $OO_1$ is the focal length f of the camera. The coordinate system $O_w$-$X_w Y_w Z_w$ is the world coordinate system. The translation vector t and the rotation matrix R are used to indicate the relationship between the camera coordinate system and the world coordinate system. The relationship between the world coordinate system and the camera coordinate system is as follows:

$$\begin{bmatrix} X_c \\ Y_c \\ Z_c \\ 1 \end{bmatrix} = \begin{bmatrix} R & t \\ 0 & 1 \end{bmatrix} \begin{bmatrix} X_W \\ Y_W \\ Z_W \\ 1 \end{bmatrix}$$

Figure 5B:
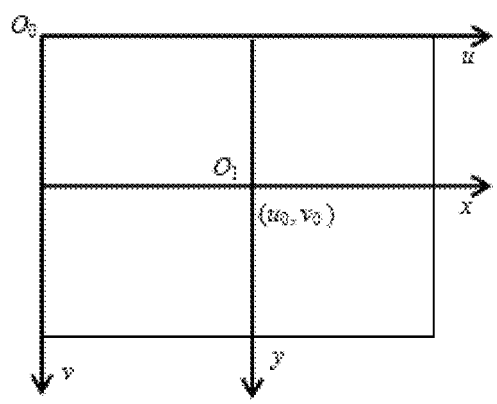
FIG. 5B is an image coordinate system.

The unit of the $O_1$-xy coordinate system is a physical unit, not a image unit of pixel. Therefore, it is necessary to construct an image coordinate system $O_0$-uv in units of pixels, in which the x-axis is parallel to the u-axis and the y-axis is parallel to the v-axis, as shown in FIG. 5B. Suppose ($u_0$, $v_0$) represents the coordinates of $O_1$ in the $O_0$-uv coordinate system, and dx and dy represent the physical dimensions of each pixel on the horizontal axis x and the vertical axis y, respectively. The following relations exist between the coordinates in the $O_0$-uv coordinate system and the coordinates in the O1-xy coordinate system:

$$\begin{cases} u = \dfrac{x}{dx} + u_0 \\ v = \dfrac{y}{dy} + v_0 \end{cases}$$

The above formula can be converted to a matrix as follows:

$$\begin{bmatrix} u \\ v \\ 1 \end{bmatrix} = \begin{bmatrix} \dfrac{1}{dx} & 0 & u_0 \\ 0 & \dfrac{1}{dy} & v_0 \\ 0 & 0 & 1 \end{bmatrix} \begin{bmatrix} x \\ y \\ 1 \end{bmatrix}$$

The conversion relationship between the coordinate system O1-xy and the coordinate system O-XcYcZc:

$$\begin{bmatrix} x \\ y \\ 1 \end{bmatrix} = \dfrac{1}{Z_c} \begin{bmatrix} f & 0 & 0 \\ 0 & f & 0 \\ 0 & 0 & 1 \end{bmatrix} \begin{bmatrix} X_c \\ Y_c \\ Z_c \end{bmatrix}$$

The above two formulas can be converted to:

$$\begin{bmatrix} u \\ v \\ 1 \end{bmatrix} = \dfrac{1}{Z_c} \begin{bmatrix} \dfrac{f}{dx} & 0 & u_0 \\ 0 & \dfrac{f}{dy} & v_0 \\ 0 & 0 & 1 \end{bmatrix} \begin{bmatrix} X_c \\ Y_c \\ Z_c \end{bmatrix}$$

The relationship between the image coordinate system $O_0$-uv and the world coordinate system $O_w$-$X_w Y_w Z_w$ is as follows:

$$\begin{bmatrix} u \\ v \\ 1 \end{bmatrix} = \dfrac{1}{Z_c} \begin{bmatrix} f_x & 0 & u_0 \\ 0 & f_y & v_0 \\ 0 & 0 & 1 \end{bmatrix} \begin{bmatrix} R & t \\ 0 & 1 \end{bmatrix} \begin{bmatrix} X_w \\ Y_w \\ Z_w \\ 1 \end{bmatrix} = \lambda AP \begin{bmatrix} X_w \\ Y_w \\ Z_w \\ 1 \end{bmatrix}$$

where A is the inner parameter matrix, P is the outer parameter matrix, and fx and fy are the normalized focal lengths on the u axis and v axis, respectively. The task of camera calibration is to estimate these two matrices.

Figure 5C:
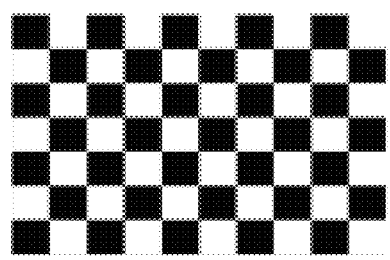
FIG. 5C is a checkerboard calibration template.

The disclosure uses the checkerboard calibration method for calibration. The main process of this method: First, a template is attached to a flat plate, as shown in FIG. 5C. Then several template images are taken from different angles and the feature points in the image are detected. Finally, the internal and external parameters of the camera are obtained from the world coordinates and image coordinates of the feature points.

Figure 6A:
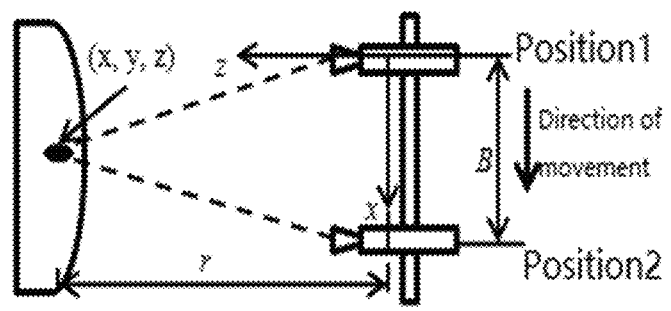
FIG. 6A illustrates a schematic diagram of a pseudo-binocular stereo vision system constructed by a monocular camera.

Substep 120. Binocular stereo vision acquires three-dimensional information by parallax based on the principle of trigonometry. The image is taken by two cameras to form a triangle between the image plane and the target. The disclosure includes the use of a pair of industrial cameras on either side of the print head to achieve binocular stereo vision measurements. In addition, as another feasible solution, in order to facilitate the realization of the mechanical structure, we study the case of only one industrial camera, and construct a pseudo binocular stereo vision system with a monocular camera for binocular measurement, as shown in FIG. 6A. The world coordinates of the three non-collinear marker points marked on the platform are measured, and the corresponding three points on the image are picked up, and the transformation matrix of the image and the world coordinates is obtained according to the three sets of coordinates.

First take a photo of the workbench with three marks from two different angles and find the boundary pixel points of the mark in the image. Secondly, the three-dimensional coordinates of the marked points are calculated by the binocular stereo vision system, and the world coordinates corresponding to the actual marked points are measured. Furthermore, according to the conversion formula of the two three-dimensional coordinate systems, the transformation matrix between the coordinate in the image and the actual three-dimensional coordinates is obtained. Finally, the coordinates of the entire image are multiplied by the transformation matrix to obtain the actual world coordinates of the platform.

Figure 6B:
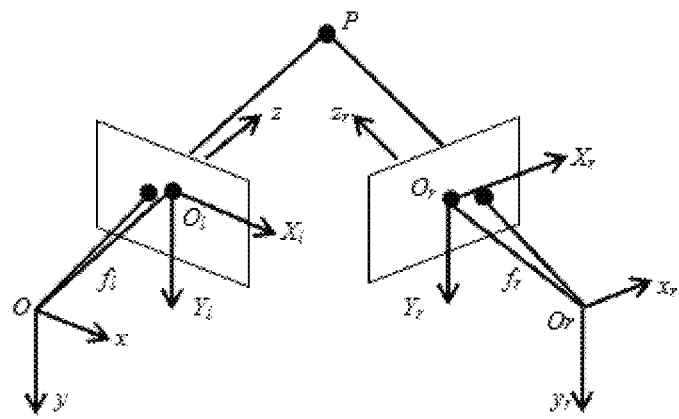
FIG. 6B illustrates a binocular stereoscopic imaging model.

Binocular stereo vision measurement is shown in FIG. 6B. Assuming that the target is a point P, the images of the point P(x, y, z) are acquired on the left and right cameras respectively, and the image coordinates are $p_l=(X_l, Y_l)$ and $p_r=(X_r, Y_r)$, respectively. O-xyz is set to the left camera coordinate system, the image coordinate system is $O$-$X_l Y_l$, and the focal length is $f_l$. $O_r$-$x_r y_r z_r$ is the right camera coordinate system, the image coordinate system is $O-X_rY_r$, and the focal length is $f_r$. Through the camera perspective transformation model, the following formula can be obtained:

$$s_l\begin{bmatrix}X_l\\Y_l\\1\end{bmatrix}=\begin{bmatrix}f_l&0&0\\0&f_l&0\\0&0&1\end{bmatrix}\begin{bmatrix}x\\y\\z\end{bmatrix}$$

The formula is also suitable for the right camera.

The conversion relationship between the coordinate system O-xyz and $Or$-$x_ry_rz_r$ is expressed as:

$$\begin{bmatrix}x_r\\y_r\\z_r\end{bmatrix}=M_{lr}\begin{bmatrix}x\\y\\z\\1\end{bmatrix}=\begin{bmatrix}r_1&r_2&r_3&t_x\\r_4&r_5&r_6&t_y\\r_7&r_8&r_9&t_z\end{bmatrix}\begin{bmatrix}x\\y\\z\\1\end{bmatrix}$$

where $r_1, r_2, \ldots, r_9$ form the rotation matrix between the two coordinate systems, and $(t_x, t_y, t_z)$ is the translation vector between them.

From the above two equations, we can knew that for the points in the coordinate system O-xyz, the corresponding transformation matrix of the image coordinates of the two cameras is:

$$s\begin{bmatrix}X_r\\Y_r\\1\end{bmatrix}=\begin{bmatrix}f_rr_1&f_rr_2&f_rr_3&f_rt_x\\f_rr_4&f_rr_5&f_rr_6&f_rt_y\\r_7&r_8&r_9&t_z\end{bmatrix}\begin{bmatrix}\frac{zX_l}{f_l}\\\frac{zY_l}{f_l}\\z\\1\end{bmatrix}$$

By solving the linear equations, the three-dimensional coordinates of the points in the O-xyz space can be obtained as follows:

$$\begin{cases}x=\dfrac{zX_1}{f_1}\\y=\dfrac{zY_1}{f_1}\\z=\dfrac{f_1(f_rt_x-X_r)}{X_r(r_7X_1+r_8Y_1+f_1f_9)-f_r(r_1X_1+r_2Y_1+f_1r_3)}\end{cases}$$

A binocular stereo vision system is constructed with a monocular camera, so the focal lengths of the left and right cameras are uniform. According to the SGBM stereo matching algorithm, the binocular correction is performed to find the rotation matrix as a unit matrix. Therefore, in this system, let's suppose two cameras are in a parallel relationship. Therefore the above equation can be deformed into:

$$\begin{cases}x=\dfrac{zX_l}{f}\\y=\dfrac{zY_l}{f}\\z=\dfrac{ft_x-X_rt_z}{X_r-X_l}\end{cases}$$

Figure 7:
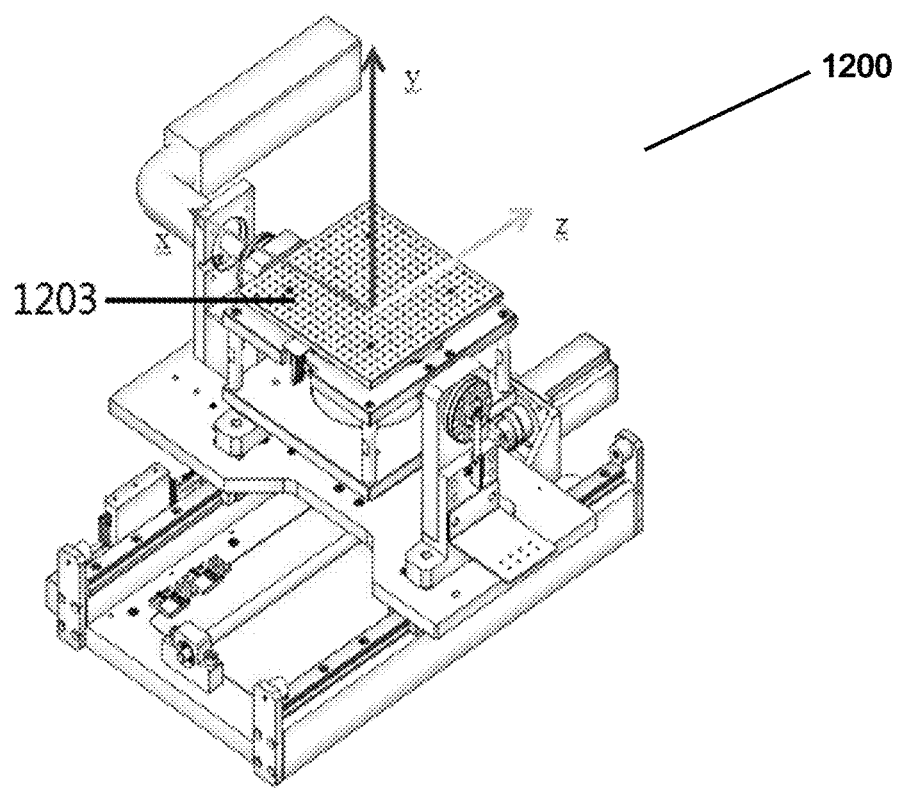
FIG. 7 is the world coordinate system of the multi-axis FDM 3D printing device.

According to the world coordinate system of the mechanical structure definition system, the disclosure takes the intersection of the first rotation axis and the second rotation axis as the origin, the translational axis in the second horizontal direction as the z-axis, the translational axis in the vertical direction as the y-axis, and the translational axis in the first horizontal direction as the x-axis. The world coordinate system is shown in FIG. 7.

Rotating this coordinate system 90° around the x-axis is the camera coordinate system. Let the world coordinate system point to $(x_w, y_w, z_w)$, then:

$$\begin{bmatrix}x_w\\y_w\\z_w\\1\end{bmatrix}=\begin{bmatrix}1&0&0&T_x\\0&0&-1&T_y\\0&1&0&T_z\\0&0&0&1\end{bmatrix}\begin{bmatrix}x\\y\\z\\1\end{bmatrix}$$

where $[T_x\ T_y\ T_z]^T$ is the translation vector between the world coordinate system and the camera coordinate system. The translation vector is solved by the initial position of the camera. The initial position of the camera is taken as the system's unique camera coordinate system, that is, all the coordinates obtained by the binocular system are first converted to the coordinates in the initial position camera coordinates before the next calculation can be performed.

The world coordinates of a point in the image under the system is:

$$\begin{bmatrix}x_w\\y_w\\z_w\\1\end{bmatrix}=\begin{bmatrix}1&0&0&-c_x\\0&0&-1&c_y-D\\0&1&0&-c_z\\0&0&0&1\end{bmatrix}\begin{bmatrix}\frac{ft_x-X_rt_z}{f(X_r-X_l)}X_l\\\frac{ft_x-X_rt_z}{f(X_r-X_l)}Y_l\\\frac{ft_x-X_rt_z}{X_r-X_l}\\1\end{bmatrix}$$

Figure 8:
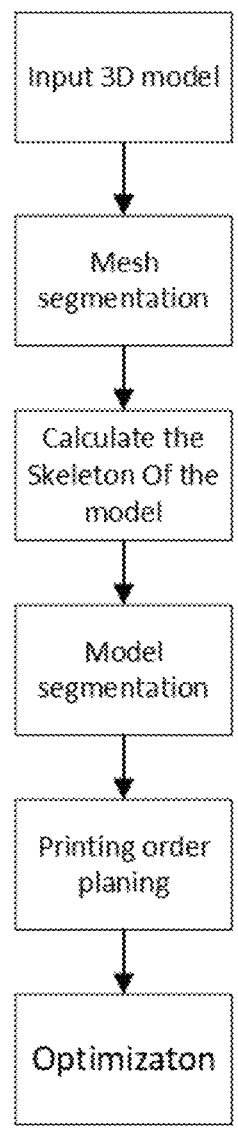
FIG. 8 is a flow chart of model decomposition.

According to a possible embodiment, Step 200 comprises the following sub-steps as shown in FIG. 8:

Substep 210. Firstly, the input model is meshed. The closed mesh is then simplified to reduce the amount of data in the model. The model is shrunk by collapse based on Laplacian mesh until it collapses into a skeleton. Laplacian-based mesh shrinkage requires repeated iterative Laplace equations until the mesh model shrinks into a skeleton. Implicit Laplace equation is as follows:

$$\begin{pmatrix}W_LL\\W_H\end{pmatrix}V'=\begin{pmatrix}0\\W_HV\end{pmatrix}$$

where WL is the diagonal matrix of contraction force, WH is the diagonal matrix of attraction, and the i-th element is $W_L, i(W_{H, i})$, and the above formula is solved by the least squares method. Least squares formula is shown as follow:

$$\|W_LLV'\|^2+\sum_i W_{H,i}^2\|V_i'-V_i\|^2$$

Figure 9A:
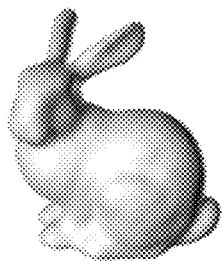
FIG. 9A is an original view of the input three-dimensional model.
Figure 9B:
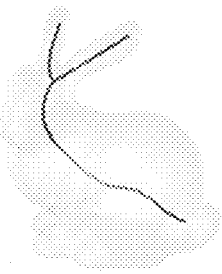
FIG. 9B is a diagram of skeleton of the three-dimensional model.

Among them, the original three-dimensional model is shown in FIG. 9A, and FIG. 9B. It is a three-dimensional model skeleton.

Substep 220. The input 3D model surface is segmented. The shape diameter metrics are first clustered according to the K-means algorithm. If the difference between the shape diameter measure values of the neighbor surface points is less than the assigned threshold m, it is clustered into one class, otherwise it is taken as a new cluster center. The clustering results are expressed as {T1}, {T2}, ..., {Tn}, n>0. Finally, the above clusters are adjusted to obtain the model surface segmentation boundary.

Substep 230. The cutting plane of the model is obtained from the boundary of the model surface segmentation. The input 3D model is roughly divided into several components according to the cutting plane.

Substep 240. The printing order of components is determined. The base plane of the first component to be printed should be a horizontal plane. The order in which other components are printed is determined based on the connection relationship between the components. Each component can be printed without external support under the condition that the angle between the print head and the platform is constant. This requires that the surface of each component be a safe surface.

The planes that satisfy the following formula are all safe surfaces that can be printed without external support:

$$\vec{n} \cdot \vec{d} - \sin \alpha_{max} \leq 0$$

where $\vec{n}$ is the normal vector of tangent plane of surface, $\vec{d}$ is the vector of print head direction, and $a_{max}$ is the maximum angle between the print head and the normal vector of tangent plane of surface. Under this condition the model can be printed without support structure.

Figure 9C:
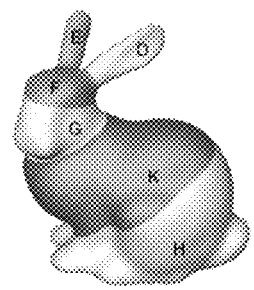
FIG. 9C is the result of model decomposition.

Substep 250. The constraints of model decomposition is: (1) The cutting planes can not intersect with each other in the model. (2) The normal of all cutting planes is vertically upward. (3) The angle between the print head and the tangent plane of the component surface should not be greater than $a_{max}$. According to the above constraints, the segmentation plane is re-adjusted so that the segmentation plane between adjacent components can be printed, and the segmentation result is as shown in FIG. 9C. The normal is vertically upwards means that the normal has not vertically downward component.

Figure 10:
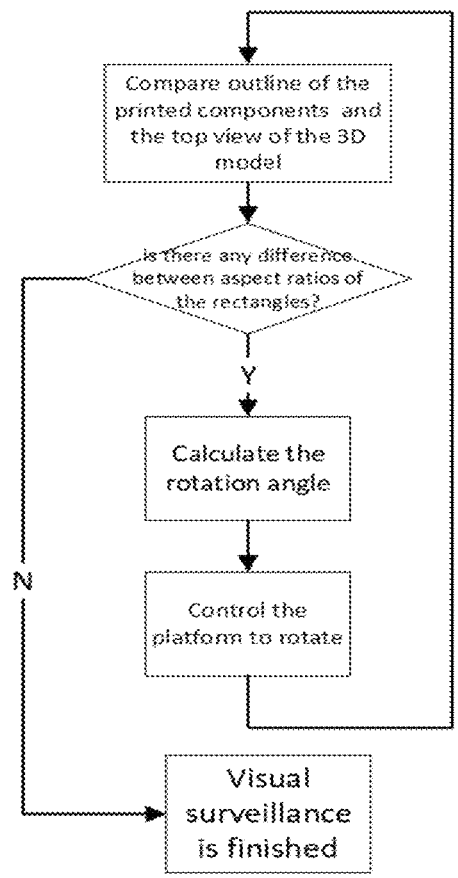
FIG. 10 is a flow chart of visual surveillance.
Figure 11:
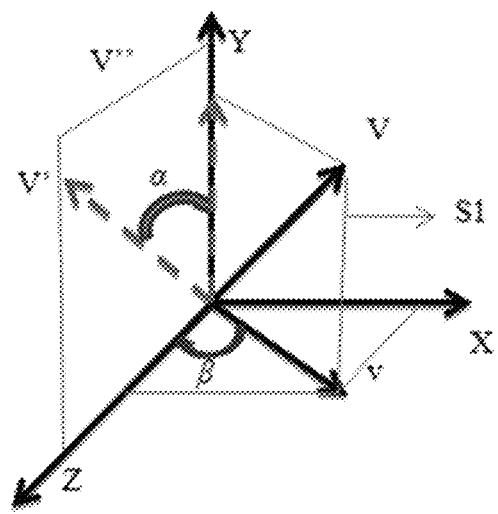
FIG. 11 is a diagram of the rotation angle.

For models that do not meet these two conditions (such as models with large overhangs), it is inevitable that the extra support is needed for successful printing. The printing method without support structure does not consider this situation. According to a possible embodiment, Step 300 comprises the following sub-steps as shown in FIG. 10:

Substep 310. The components are printed one by one in the printing order obtained in Step 200. The method of printing each component is not different from traditional printing, so printing of each component is easy to implement. The disclosure achieves a good connection at the cutting plane of the components by the positional relationship between the component to be printed and the printed components. The Gcode of each component is generated in sequence and loaded for printing. After one component is printed out, the platform is rotated so that the cutting plane for the component is horizontal. Furthermore, visual surveillance is used to inspect the levelness of the cutting plane.

Substep 320. Suppose $V=(v_x, v_y, v_z)$ is projected onto the plane of xoy and the projection vector is $v=(v_x, v_y, 0)$. The angle vector V rotate by Z axis to vector V' is equal to the angle between plane S1 with vector V and plane S2 with vector V'. This angle is also equal to the angle $\alpha$ between the vector v and Y axis. Angle $\beta$ is the vector V' rotate by X axis, so that the final vector is parallel to Z axis. According to a transformation equation of a rotated vector, the two angles can be represented by:

$$\begin{cases} \beta = \arccos \dfrac{v_y}{\sqrt{v_x^2 + v_y^2}} \\ \alpha = \arccos \dfrac{v_z}{\sqrt{v_x^2 + v_y^2 + v_z^2}} \end{cases}$$

Thus, a vector can be represented by two the angles $\alpha$ and $\beta$. Let $\alpha_1$, $\beta_1$ represent the normal vector of the current base plane and $\alpha_2$, $\beta_2$ represent the normal vector of the next base plane, then the following equation is obtained:

$$\alpha_3 = (\alpha_2 - \alpha_1)$$

$$\beta_3 = (\beta_2 - \beta_1)$$

where $\alpha_3$, $\beta_3$ represent the rotation angle.

Three non-collinear markers are placed on the platform before starting print. After taking a picture with the camera, the points on the image are extracted. First, the image is subjected to color histogram equalization, and then the image of the color histogram equalization is binarized, if the R channel value of a pixel is greater than twice of the sum of the B channel and the G channel, it is assigned as 1, otherwise, it is 0, that is, $$P_{ij} = \begin{cases} 1, R_{P_{ij}} > 2 \times (B_{P_{ij}}, G_{P_{ij}}) \\ 0, \text{else} \end{cases}$$

Contour extraction is performed on the binarized image according to the image connected domain to obtain the position of the marker point in the image. The coordinates of the marker points in the world coordinate system can be obtained by multiplying the coordinates of the marker points by the transformation matrix.

The plane of the platform and its normal vector can be obtained according to the position of the marked points on the image. Assuming the coordinates of the three non-collinear points on the model are $(x_i, y_i, z_i)$, $(x_2, y_2, z_2)$, $(x_3, y_3, z_3)$, then the plane equation is shown as flow:

$$A(x-x_1) + B(y-y_1) + C(z-z_1) = 0$$

Coordinates with three points to solve the coefficients A, B, C:

$$\begin{cases} A = (y_3 - y_1) \times (z_3 - z_1) - (z_2 - z_1) \times (y_3 - y_1) \\ B = (x_3 - x_1) \times (z_2 - z_1) - (x_2 - x_1) \times (z_3 - z_1) \\ C = (x_2 - x_1) \times (y_3 - y_1) - (x_3 - x_1) \times (y_2 - y_1) \end{cases}$$

Then its normal vector $\vec{n} = (n_x, n_y, n_z)$ is:

$$\begin{cases} n_x = \dfrac{A}{\sqrt{A^2 + B^2 + C^2}} \\ n_y = \dfrac{B}{\sqrt{A^2 + B^2 + C^2}} \\ n_z = \dfrac{C}{\sqrt{A^2 + B^2 + C^2}} \end{cases}$$

If the normal vector is vertically upward, the next component will then be printed. On the contrary, if the normal vector is not vertically upward, the normal vector of the platform plane is represented by $\alpha_1$, $\beta_1$ and the vertically upward vector is represented by $\alpha_2=0$, $\beta_2=0$, and complementary rotation angles can be calculated and then complementary rotation is performed until the levelness meets the requirements.

Substep 330. When a component is printed out, the control system drives the platform and the printed component to rotate. After the current component is printed out, we know the current position of the platform and the normal vector of the platform $\alpha_1$, $\beta_1$. During the whole printing process, the 3D model is synchronized with the printing process. After the 3D model is rotated to a target position (where the normal vector of the base plane of the component to be printed on the printed components is vertically upward), the current position of the platform and the normal vector of the platform $\alpha_2$, $\beta_2$ are calculated, and the rotation angle and the translation are calculated according to the model position.

Substep 340. Visual surveillance. An industrial camera is used for visual inspection of the platform. After the platform is rotated, a picture is taken. By looking at this picture, we can get a detailed outline of the printed components. The minimum circumscribed rectangle of the contour and its aspect ratio are calculated. At the same time, the top view of the 3D model synchronized with the printing process is calculated, and the minimum circumscribed rectangle is obtained and the aspect ratio of the rectangle is calculated. If the minimum circumscribed rectangle aspect ratio of the top view of the printed components is substantially equal to the minimum circumscribed rectangle aspect ratio of the 3D model's overhead profile synchronized to the printing process, the platform is rotated into position. If the error tolerance is exceeded the assigned range, repeat the above Steps until the rotation is accurate.

If the mechanical rotation is in place, the Gcode of the next component is read for printing. It repeats until all the components are printed.

The presented 3D printing method and device with multi-axis mechanical system and visual surveillance has the following advantages:

1) Printing model by the presented method can save printing materials and save time for manual removal of support structure;

2) This multi-axis 3D printing method can print complicated models with minimal external support and has strong applicability. Therefore, the disclosure has a certain application value and significance.

It should be noted that the printing device and method described above are only capable of implementing specific embodiments of the disclosure. Various modifications to these embodiments can be made according to the concept of the disclosure. For example, the printing device of the disclosure (including but not limited to FDM 3D printer) include a mechanical system of five DOF (3 DOF of translate and 2 DOF of rotation).

The five DOF of the mechanical system of the disclosure are distributed in such a manner: The printing mechanism can not be rotated, and the platform can be translated or rotated as needed. The print head is always in a vertically downward direction to ensure the positioning accuracy of the print head.

In addition, to achieve five degrees of freedom, a wide variety of configurations can be employed, such as the motors described above, various actuating cylinders, and so on.

Further, in the example shown in the drawings, the printing mechanism is an extrusion type print head. However, the disclosure is equally applicable to other forms of printer mechanism.

Therefore, the scope of the disclosure is not limited to the details described above. Various modifications may be made to these details without departing from the basic principles of the disclosure.

What is claimed is:

1. A multi-degree-of-freedom (Multi-DOF) 3D printing device comprising a printer mechanism, a rotatable platform, a visual inspection system and a control system;
    wherein the printing mechanism includes a print head; the rotatable platform includes a platform, the print head being adapted to print on the platform; the printing mechanism and the rotatable platform being combined to provide at least three degrees of freedom of translation, and the rotatable platform having at least two degrees of freedom of rotation;
    wherein the visual inspection system includes a single camera mounted to print head be movable together with the print head;
    wherein the control system is configured to decompose a model to be printed into several components; and wherein, before printing each component, the orientation of a base plane of the component to be printed is monitored by the camera, the base plane being provided on components that have been printed and formed already on the rotatable platform, and meanwhile the rotatable platform is controlled to rotate to move the base plane of the component to be printed into an orientation which is suitable for the print head to perform printing so that the component to be printed is fully supported by the components that have been printed,
    wherein the camera is arranged on one side of a first horizontal direction of the print head, and
    wherein the control system is further configured to:
        construct a pseudo binocular stereo vision system by the single camera; and
        calculate coordinates of the platform by:
            translating the camera, taking a photo of the platform, on which three marks are attached, from two different angles using the camera, and finding boundary pixel points of the marks in the photo;
            calculating the three-dimensional coordinates of the marks by using the binocular stereo vision system, and measuring the world coordinates corresponding to the marks;
            obtaining a transformation matrix between the coordinates of the photo taken by the camera and the actual three-dimensional coordinates; and
            obtaining the actual world coordinates of the platform by multiplying the coordinates of the image with the transformation matrix.

2. The Multi-DOF 3D printing device according to claim 1, wherein the printing mechanism includes a vertical translational motor assembly and a first horizontal translational motor assembly, the vertical translational motor assembly driving the print head to move in a vertical direction, and the first horizontal translation axis driving the print head to move in the first horizontal direction that is perpendicular to the vertical direction; and wherein the rotatable platform includes a second horizontal translational motor assembly, a first rotational motor assembly and a second rotational motor assembly, the second horizontal translational motor assembly driving the platform to move in a second horizontal direction perpendicular to the vertical direction and the first horizontal direction, the first rotation motor assembly driving the platform to rotate around a vertical rotational axis, and the second rotation motor assembly driving the platform to rotate around a horizontal rotational axis.

3. The Multi-DOF 3D printing device according to claim 2, wherein the first rotational motor assembly, the second rotational motor assembly and the platform are coupled to the output shaft of the second horizontal translation motor assembly and driven by the second horizontal translation motor assembly, the second rotational motor assembly and the platform are coupled to the output shaft of the first rotational motor assembly, and driven by the first rotation motor assembly, and the platform is driven by the second rotation motor assembly.

4. The Multi-DOF 3D printing device according to claim 3, wherein the horizontal rotational axis extends in the first horizontal direction in the state where the first rotation motor assembly does not drive the second rotational motor assembly, and the platform to rotate.

5. The Multi-DOF 3D printing device according to claim 1, wherein the control system compares the monitoring image of the camera with the base plane of the component to be printed to determine whether the base plane of the component to be printed has reached an orientation suitable for printing by the print head.

6. The Multi-DOF 3D printing device according to claim 1, wherein the orientation suitable for printing by the print head satisfies the condition that the base plane of the component to be printed is horizontal and the base plane defines a normal vector pointed vertically upwards.

7. The Multi-DOF 3D printing device according to claim 6, wherein the orientation suitable for printing by the print head further satisfies the following condition: during the printing process of each component, the angle between the print head and the surface of the component is not greater than a set threshold.

8. The Multi-DOF 3D printing device according to claim 7, wherein the orientation suitable for printing by the print head further satisfies the condition that the center of gravity of the module to be printed falls within the outer contour of the base plane, at or near the geometric center of the base plane.

9. The Multi-DOF 3D printing device according to claim 1, wherein the control device is arranged such that each component is printed with the same angle between the print head and the platform;
   wherein the printing component to be printed is supported only by the printed components and platform, and the components are printed in a predetermined order.

10. The Multi-DOF 3D printing device according to claim 1, the control system is configured to divide the 3D model to be printed in the following manner:
   firstly, calculate and normalize the SDF (shape diameter function) values in the model;
   secondly, the input 3D model is subjected to model surface segmentation, wherein the SDF value is used as an adjustment factor;
   and then, the input 3D model is initially divided into multiple components based on the boundary of the model surface segmentation;
   next, select the first printed component and determine the print order of other components based on the connections between components;
   finally, the results of the preliminary division are accurately divided so that cutting planes between adjacent components become printable.

11. The Multi-DOF 3D printing device according to claim 10, wherein the control system is arranged to adjust the cutting plane and merge the components that do not satisfy the following conditions: the cutting planes cannot intersect in the model, and the base plane of each component after cutting has a normal vector pointed upwards.

12. The Multi-DOF 3D printing device according to claim 11, wherein the control system is arranged to adjust the cutting plane between adjacent components such that the angle between the print head and the surface of the component to be printed is not greater than a threshold.

* * * * *